INVENTOR
LESLIE C. CHOUINGS
BY Lawrence J. Winter
ATTORNEY

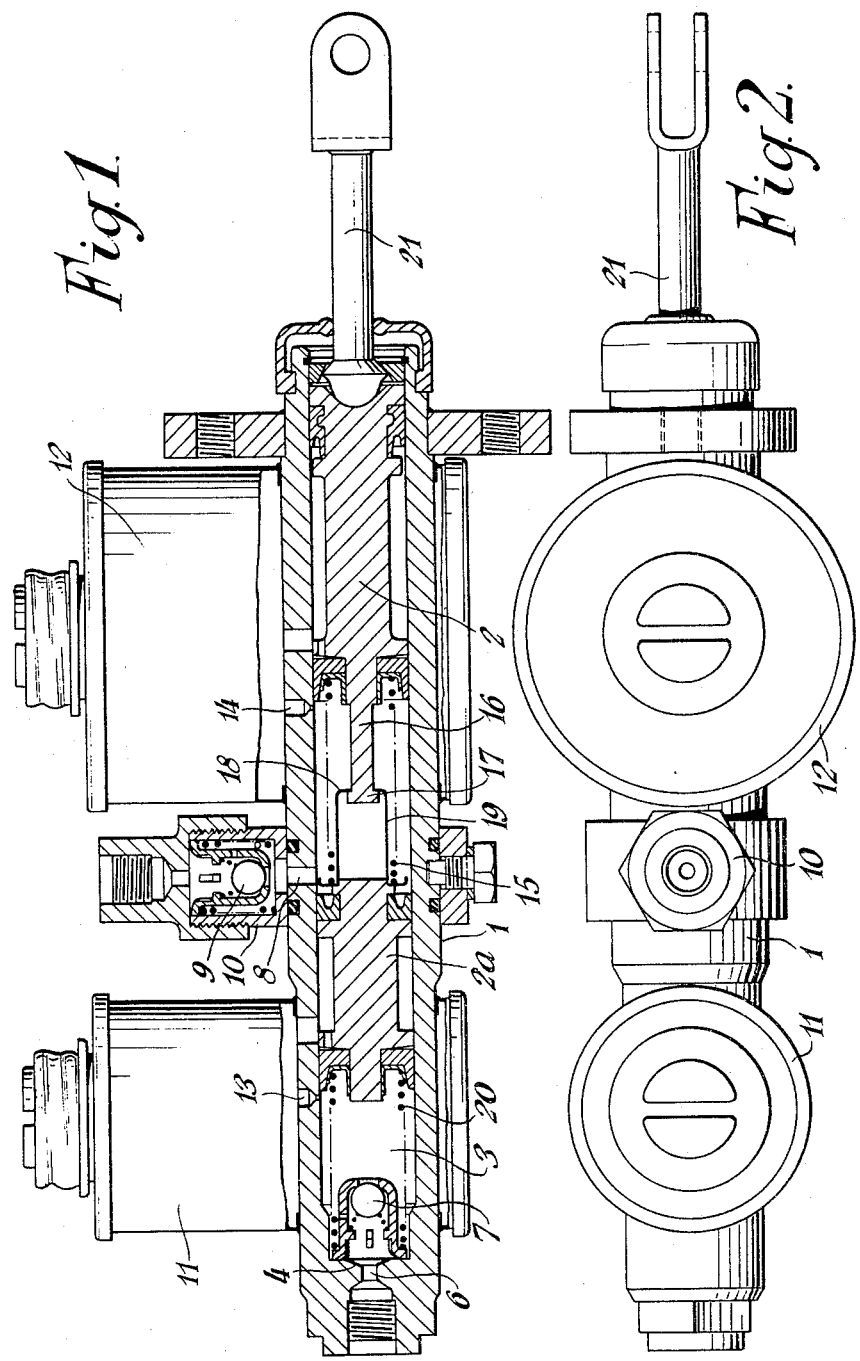

United States Patent Office 3,210,942
Patented Oct. 12, 1965

3,210,942
HYDRAULIC BRAKE MECHANISMS
Leslie C. Chouings, Leamington Spa, England, assignor to Automotive Products Company Limited, Leamington Spa, England
Filed Nov. 16, 1961, Ser. No. 152,861
Claims priority, application Great Britain, Nov. 16, 1960, 39,293/60
1 Claim. (Cl. 60—54.6)

This invention relates to master cylinders for liquid pressure braking systems of the kind generally known as "tandem master cylinders," having two separate liquid chambers each adapted to be connected to one of two groups of brakes, one such chamber being located between a closed end of the cylinder and a piston, herein referred to as the secondary piston, and the other chamber being located between the secondary piston and a main piston which is actuated to create pressure in both chambers.

Master cylinders of the kind referred to provide protection against total failure of the brakes in the event of substantial leakage of liquid from a pipe or wheel cylinder of the system, since pressure can be produced in one chamber of the master cylinder to operate the brakes connected to that chamber even if the other chamber is completely emptied of liquid.

The object of the present invention is to provide improvements in the construction of tandem master cylinders, which improvements result in advantages in the operation thereof.

In a tandem master cylinder according to the invention the main and secondary pistons, which are arranged as hither-to, one behind the other in axial alignment are mechanically interconnected so as to be jointly movable upon operation of the brake operating foot pedal or other operator operated means. The invention can for example be carried out by interposing a compression spring between the adjacent ends of the two pistons the pistons being maintained in axial spaced relationship against the spring action by restraining means associated with the two pistons whereby the pistons are movable jointly from a retracted position upon operation of the foot pedal or other operator operated means and against the action of spring loading tending to return the pistons jointly to the retracted position. A tandem master cylinder according to the invention has the advantage that the travel loss between the pistons is reduced because the breather ports through which the cylinder spaces communicate with the reservoirs containing the operating fluid can be closed substantially at the same time instead of one after the other as with existing constructions of tandem master cylinder. In addition a reduction in overall length is obtained as the stop normally provided for limiting the stroke of the secondary piston can be dispensed with.

Embodiments of tandem master cylinders in accordance with the invention will now be described by way of example by aid of the accompanying drawings in which:

FIGURE 1 is a longitudinal section of a tandem master cylinder according to one embodiment;

FIGURE 2 is a plan view thereof; and

Figure 3:
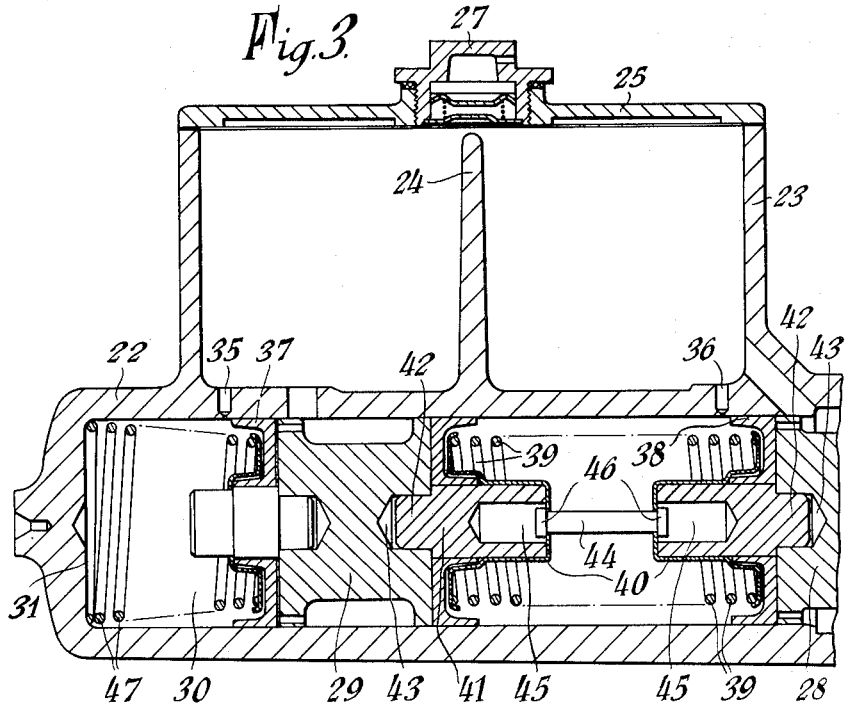
FIGURE 3 is a longitudinal section of a master cylinder according to a further embodiment of the invention.

Referring to FIGURES 1 and 2 of the drawings the tandem master cylinder has a tubular body 1 the bore of which contains a main piston 2 and a secondary piston 2*a* arranged one behind the other in axially spaced relationship. The pistons divide the bore into two separate liquid chambers, a chamber 3 between the end 4 of the cylinder and the secondary piston 2*a* and a further chamber 5 between the secondary and main pistons. The end 4 of the cylinder 1 has an outlet 6 in communication with the chamber 3 the flow of liquid therethrough being controlled by a spring loaded ball valve denoted generally by reference numeral 7. A further outlet 8 provided by a radial drilling through the wall of the cylinder is in communication with the chamber 5 the flow of liquid therethrough being controlled by a further spring loaded ball valve denoted generally by reference numeral 9, the ball valve assembly being located in a housing 10 extending radially from the tubular body 1.

Mounted on the tubular body 1 are two tanks 11 and 12 respectively axially spaced from one another, the tubular body passing diametrically through both tanks. The tanks provide reservoirs for hydraulic liquid, the tank 11 communicating with the chamber 3 through a breather port 13 in the wall of the tubular body and the tank 12 communicating with chamber 5 through a breather port 14 also in the wall of the tubular body. The breather ports are axially spaced from one another so that with the pistons in the retracted position shown the ports are substantially at the same axial distance from the associated piston and the chambers 3 and 5 are connected to the tanks the said chambers being isolated from the tanks substantially at the same time upon joint movement of the pistons from the retracted position by the passage over the ports 13, 14 of sealing members moving with the said pistons.

A compression spring 15 is interposed between the adjacent ends of the two pistons the pistons being retained in the desired axial spacing against the spring action by restraining means comprising a rod member 16 extending outwardly from the forward end of the main piston and having an enlarged head 17 at its outer end which is engageable with an abutment 18 provided by the inner surface of the end of a cylindrical metal cap 19 projecting rearwardly from the rear end of the secondary piston and into which the rod member extends. The two pistons are thus axially movable jointly in one direction or the other and are urged to the normally retracted position by a spring 20 interposed between the outer end of the secondary piston and the adjacent end 4 of the tubular body.

Figure 4:
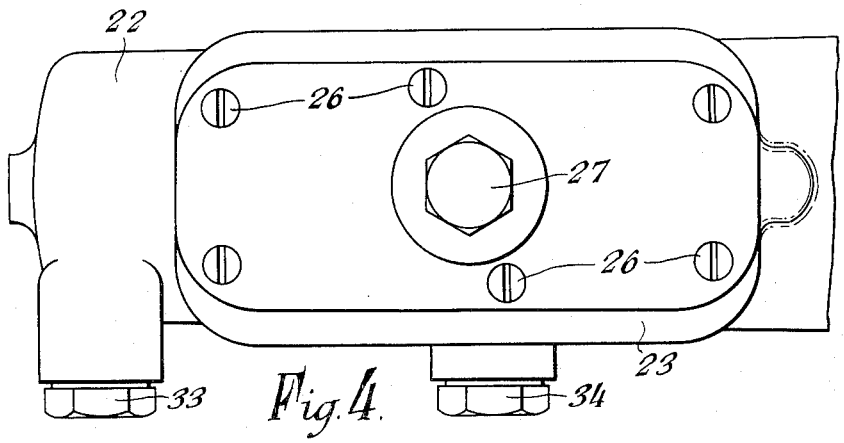
FIGURE 4 is a plan view thereof.

In the embodiment according to FIGURES 3 and 4 of the drawings the tubular body 22 of the tandem master cylinder is formed integral with a tank 23 for hydraulic liquid the interior of which is divided by a baffle 24. The tank has a removable cover 25 secured by screws 26, the removable cover being provided with a filler cap 27. The bore of the tubular body contains two pistons, a main piston 28 and a secondary piston 29. The pistons divide the bore into two separate liquid chambers, a chamber 30 between the end 31 of the tubular body and the opposite end of the secondary piston 29 and a further chamber 32 between the secondary and main pistons. Valve controlled openings 33 and 34 provided in the tubular body 22 communicate respectively with the chambers 30 and 32. In addition the chamber 30 communicates with the interior of the tank through a breather port 35 and the chamber 32 communicating with the tank interior through a breather port 36. As in the first-described embodiment the breather ports are axially spaced from one another so that with the pistons in the retracted position shown the ports are at substantially the same axial distance from the associated piston and the chambers 30 and 32 are connected to the tank, the said chambers being isolated from the tank substantially at the same time upon the joint movement of the pistons from the retracted position by the passage over the breather ports of sealing members 37, 38 moving with the pistons.

A compression spring 39 is interposed between the two pistons the opposite ends of the spring each bearing against a spring cup 40 each of which is supported on a spigot 41 projecting outwardly from the appropriate ends of the pistons. Each spigot has a portion 42 of reduced diameter which is locatable in an axial hole 43 in the piston. The pistons are retained in the desired axial spacing by restraining means comprising a rod member 44 the opposite ends of which extend through appropriate holes in the spring cups 40 and into a recess 45 in each spigot, the rod ends each being provided with an enlarged head 46 providing stops each of which engages with opposite abutment faces of the spring cups. The two pistons are thus axially movable jointly in one direction or the other and are urged to the normally retracted position by a spring 47 interposed between the end 31 of the tubular body and the opposite face of the secondary piston.

The tandem master cylinder according to either of the above embodiments is incorporated in a hydraulic braking system in the usual manner by connecting the cylinder space between the two pistons to the wheel cylinders of the wheels on one axle and the cylinder space in front of the front piston to the wheel cylinders of the wheels on the other axle, the rear piston being operatively associated with for example the brake foot pedal through a plunger 21 (FIGURE 1). Thus under normal conditions of operation the two pistons will move jointly when the foot pedal is depressed against the spring loading on the front piston, such spring loading serving to return the two pistons jointly to the retracted position when the pedal is released. In the event of a fault occurring in the hydraulic system connected to the cylinder space of the front piston such piston will be moved to the end of its cylinder whilst the other piston operates the brakes associated therewith. If however a fault occurs in the system connected to the cylinder space between the pistons the axial movement of the rear piston will be imparted to the front piston through the mechanical connection provided by the interposed compression spring.

Conveniently the supply tanks or tank for the hydraulic fluid can be mounted on the tubular body of the tandem master cylinder.

I claim:

A tandem master cylinder for brakes comprising a cylindrical casing having a front and rear end and an internal bore of substantially the same diameter between said ends, a secondary piston slidably disposed in said casing adjacent the front end thereof, a main piston of substantially the same diameter as the secondary piston slidably disposed in said casing adjacent the rear end of said casing, a first liquid chamber in said casing forward of said secondary piston, said pistons having spring cups abutting the facing sides of said pistons, a compression spring having its opposite ends disposed in said cups for maintaining said pistons in spaced axial relationship with each other to form a second liquid chamber between said pistons, a rod member extending axially of said second liquid chamber and mounted centrally of said compression spring, said rod being secured to said main piston and having a head on its opposite end engageable with the spring cup of said secondary piston, a single compression spring only disposed in said first liquid chamber to maintain said pistons in a retracted position toward the rear end of said casing, a first cylindrical vertical hydraulic liquid tank disposed on top of said casing above said first liquid chamber, a first port means in said casing in communication with said first liquid chamber and said first tank, a second cylindrical vertical hydraulic liquid tank disposed on top of said casing axially spaced from said first tank, and of a larger size than said first tank and isolated from said first tank, a second port means in said casing in communication with said second tank and said second liquid chamber, a first liquid outlet connection in said first liquid chamber in axial alignment with the bore of said casing, a second vertical liquid outlet connection in said second liquid chamber positioned between said first and second tanks, means for simultaneously moving said pistons toward the forward end of said casing, said first and second outlet connections being axially spaced in said casing the same axially distance from the respective piston adjacent thereto when said pistons are in a retracted position so liquid from said isolated first and second tanks is shut off to its respective chamber and at substantially the same time upon joint forward movement of said pistons.

References Cited by the Examiner

UNITED STATES PATENTS

| 1,943,886 | 1/34 | Carroll | 60—54.6 |
| 2,098,653 | 11/37 | Carroll | 60—54.6 |
| 2,732,918 | 1/56 | Hackworth | 60—54.6 |
| 2,992,533 | 7/61 | Hodkinson | 60—54.6 X |
| 3,060,691 | 10/62 | Davis | 60—54.6 |
| 3,149,468 | 9/64 | Shutt | 60—54.6 |

SAMUEL LEVINE, *Primary Examiner.*

ROBERT R. BUNEVICH, JULIUS E. WEST, *Examiners.*